May 4, 1965
H. B. IRVIN
3,182,050
BULK POLYMERIZATION
Filed Oct. 19, 1962
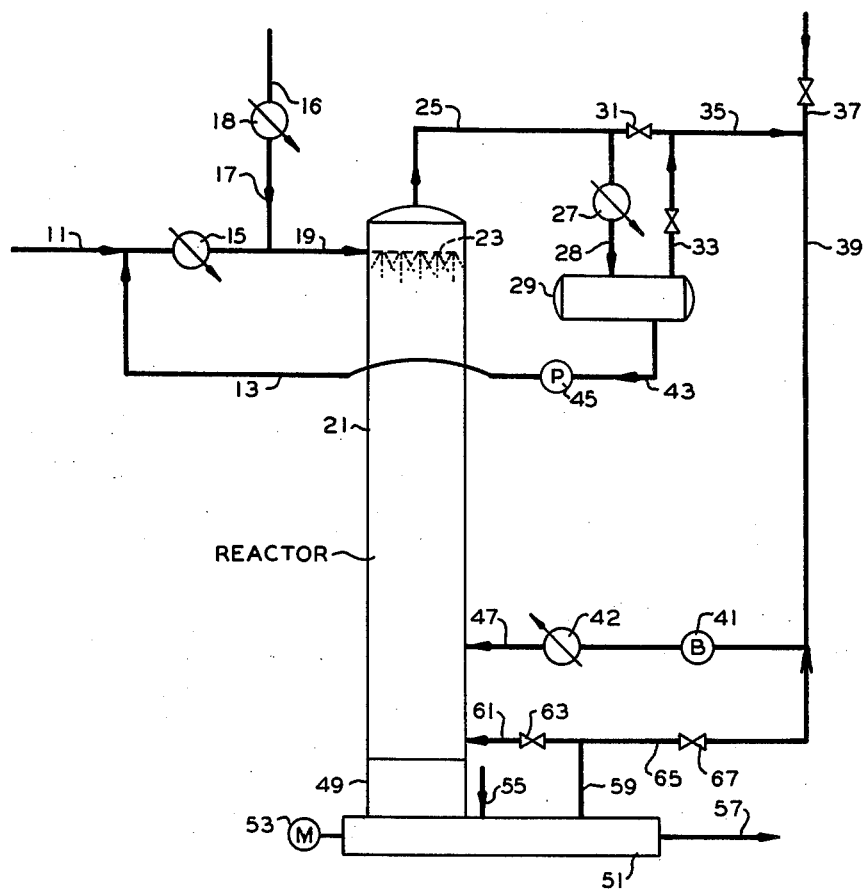
INVENTOR.
H.B. IRVIN
BY Young & Quigg
ATTORNEYS United States Patent Office 3,182,050
Patented May 4, 1965

3,182,050
BULK POLYMERIZATION
Howard B. Irvin, Bartlesville, Okla., assignor to Phillips Petroleum Company, a corporation of Delaware
Filed Oct. 19, 1962, Ser. No. 231,765
12 Claims. (Cl. 260—94.2)

This invention relates to bulk polymerization. In one aspect it relates to bulk polymerization of polymerizable monomers for the production of rubbers and of plastics. In another aspect it relates to bulk polymerization of conjugated dienes either alone or in admixture with each other and/or with, in minor amounts, one or more monomeric 1-olefinic materials. In yet another aspect it relates to bulk polymerization of mono-1-olefins.

The most economic method of manufacturing rubbers and pastics is polymerizing the monomeric materials in bulk without the expense, etc., of employing a solvent for the monomeric feed materials. The use of solvents in commercial solution processes involves producing a solution of the monomer, or monomers, and carrying out the actual polymerization reaction in solution, then separating the polymeric material from the solvent, purifying the separated solvent if necessary, and recycling the solvent in the process.

According to this invention, I spray a mixture of monomer or monomers and a suitable polymerization catalyst at a temperature below operational polymerization temperature downwardly in the upper portion of a spray tower more or less similar to a spray drying tower. As the spray droplets fall downwardly in the tower, they are heated to polymerization temperature by upflowing, hot monomer vapor. Polymerization then proceeds rapidly and vaporization of unreacted monomer absorbs exothermic heat of polymerization, thereby preventing runaway or otherwise undesirably rapid polymerization. Before reaching the bottom of the tower, the unvaporized monomeric material is nearly completely converted to polymer. The particles at the bottom of the tower contain only a very small amount of the original liquid monomeric material. These polymer particles fall into the feed section of an extruder-devolatilizer, or another device which performs the same function, in which the remaining monomeric material is removed, Shortstop, antioxidant, extender oil in case of rubber, carbon black or other pigment, or any other ingredient desired is added to the polymer at least near the feed end of the devolatilizer device.

An object of this invention is to provide apparatus and a process for the bulk polymerization of polymerizable monomers. Another object of this invention is to provide apparatus and a process for the polymerization of polymerizable monomers in the absence of a solvent. Yet another object of this invention is to provide apparatus and a process for polymerization of polymerizable hydrocarbon monomers in the absence of a solvent. Still other objects and advantages of this invention will be realized upon reading the following description which, taken with the attached drawing, forms a part of this specification.

The drawing illustrates, in diagrammatic form, an arrangement of apparatus parts for carrying out the process of this invention.

In the drawing, reference numeral 11 identifies a conduit through which is passed, from a source not shown, a liquid monomeric material or materials to be polymerized. A heat exchanger 15, operating as a cooler, cools the charge material which then passes to a spray tower 21 by way of a conduit 19. A suitable catalyst for the process passes, from a source not shown, through a conduit 16, is cooled in a cooler 18 and then passes on through a conduit 17 and is incorporated with the charge liquid in conduit 19. The mixture of catalyst and monomeric feed material is then syrayed downwardly in the upper portion of vessel 21 by spray nozzles 23. A preheated stream of vapor of the monomeric material, in admixture with an inert gas if necessary, is, on starting up the operation, introduced into the lower portion of vessel 21 by way of a conduit 47. The heated vapors, on rising upwardly in vessel 21, warm the downflowing spray droplets to polymerization temperature. Once polymerization is started, exchanger 42 then is operated as a cooler to help remove the heat of polymerization. Upon rising in the tower, the monomer vapor, with or without inert gas, from conduit 47 is heated by the polymerizing droplets. When the vapor, with or without the added gas, reaches the upper part of the tower, it in turn heats the monomer-catalyst mixture sprayed into the tower. Vapors reaching the top of vessel 21 are withdrawn through a conduit 25 to a condenser 27 in which a portion of the vapors are condensed. Condensate passes into a accumulator 29 by way of a conduit 28. The accumulated condensate is recycled by way of a conduit 43, pump 45 and conduit 13 to the monomer feed conduit 11. Uncondensed vapor, with or without the inert gas, from the accumulator is passed through conduits 33, 35 and 39 under suction of a blower 41 from which the vapors are forced through exchanger and conduit 47 as the heated or cooled vapors mentioned hereinbefore. Condenser 27 is ordinarily cooled by conventional plant cooling water.

If desired, all or substantially all of the vapor passing through the condenser can be condensed and the amount of vapor required for introducing through conduit 47 can be regulated by manipulation of the valve 31.

The inert gas, mentioned above, can be such as gas as nitrogen, carbon dioxide or other inexpensive gas inert to the process. When such an inert gas is employed, it can be introduced into the system through a conduit 37 from a suitable source, not shown.

When an inert gas is employed in the gaseous or vaporous portion of the cycle, it is only necessary to condense the monomeric vapor issuing with the inert gas by way of conduit 25. Furthermore, it is not necessary to condense all of the monomeric vapors but sufficient of the vapor is condensed to prevent build-up of the monomeric vapor content in the inert gas.

The polymerization reaction occurs rapidly and by the time the spray droplets of monomeric material reach the bottom of tower 21 polymerization is substantially complete and the droplets are solid particles. These solid particles contain only a minor amount of liquid monomer. The solid polymer particles fall into the feed end of an extruder-devolatilizer 51 by way of a conduit 49 which is actually a downward extension of the walls of vessel 21. This extruder-devolatilizer 51 is powered by a motor 53 and extrudate passes from the extruder through a conduit 57 for such disposal as desired. This extruder-devolatilizer is primarily a devolatilizer and is sometimes provided with a heating means, not shown, which provides sufficient heat for vaporizing any remaining liquid monomeric material.

In case the extruder-devolatilizer is a more or less conventional extruder, the heat of mixing or milling is the only effective source of heat in this type of machine. Jacket heating is usually ineffective. Apparatus 51 can be a vibrating screen, and in this case a heater can be used to provide heat for monomer removal. When a vibrating screen is used, a star valve or other vapor-tight means should be used between the bottom of tower 21 and the screen to prevent inadverent inflow or outflow of gas, vapor or air.

The vapors from the volatilization section of apparatus 51 pass through a conduit 59, are compresesd by a compressor or blower, not shown, and passed through a conduit 61 or through a conduit 65 to be combined with gas or vapor in conduit 39. Manipulation of valves 63 and 67 determines the flow path folowed by the volatilized vapors on their return to tower 21.

A conduit 55 is provided for introduction to the extruder-devolatilizer of such additives as a shortstop, antioxidant, extender oil, carbon black, other pigment or reinforcing agent to the polymer when the polymer is a rubber before or after vent conduit 59, but far enough ahead of the discharge conduit 57 to insure thorough incorporation in the product rubber. In some instances it is desirable to add some of these ingredients after the monomer vent (59) in order to prevent contamination of polymerizing system with poisons (for example, decomposition products of certain antioxidants).

As an example of the operation of the process of this invention, a feed stock of 5,000 pounds per hour of 1,3-butadiene (monomer) is charged through conduit 11 and cooled to 100° F. in heat exchanger 15. Then 13,500 pounds per hour of recycle butadiene monomer, previously cooled to about 100° F. by condenser 27, is added thereto upstream or downstream of condenser 15. When condenser 27 produces condensate at about 100° F. or lower, the returned condensate can be added to the feed downstream of cooler 15. By such procedure, cooler 15 can be a smaller piece of equipment than when conduit 13 adds condenaste upstream of the cooler. Next, butyl lithium in a nonvolatile solvent is added to the monomer in line 19 from line 17. This catalyst is also cooled to about 100° F. or, in some instances, it need not be cooled since the volume ratio of the catalyst to butadiene monomer feed is very low. Polymerization in conduit 19 and in spray nozzles 23 is relatively slow because of the low temperature of the feed mixture. As spray droplets are formed, they pass downwardly and countercurrently with respect to upflowing, hot nitrogen gas and vaporous butadiene. These gases are heated to such a temperature as to heat the sprayed monomer to a suitable reaction temperature of approximately 150° F. At this temperature polymerization is quite rapid. The polymerization reaction is exothermic, thus tending to heat the polymerizing spray to a still higher temperature. This higher temperature in conjunction with the upflowing stream of gases vaporizes a portion of the monomer. Vaporization is endothermic, thus neutralizing or cancelling exothermic heat of polymerization and thereby preventing runaway and uncontrolled polymerization. In this manner the maximum temperature at any location in vessel 21 is approximately 150° F. Pressure is maintained at about 330 p.s.i.a. (pounds per square inch absolute). In accumulator 29 the condensate temperature is approximately 100° F. and pressure is about 327 p.s.i.a.

At an accumulator temperature of 100° F. there is quite an appreciable partial pressure of butadiene vapor in the gas phase over the liquid, and this butadiene monomer vapor is recycled with the nitrogen through conduit 47 to the reaction tower. The following tabulation sums up the material balance discussed above (catalyst, antioxidant, shortstop, extender oil, carbon black, etc., being omitted).

|  | Pounds per Hour | | | | | |
| --- | --- | --- | --- | --- | --- | --- |
| Stream No. | 11 | 13 | 19 | 47 | 25 | 57 |
| Component: | | | | | | |
| Butadiene | 5,000 | 13,500 | 18,500 | 11,100 | 24,600 | |
| Nitrogen | | | | 25,500 | 25,500 | |
| Polymer | | | | | | 5,000 |
| Total | 5,000 | 13,500 | 18,500 | 36,600 | 50,100 | 5,000 |

While in the above instance a temperature of about 150° F. and a pressure of about 330 p.s.i.a. are maintained in the reactor, these operating conditions are variable. For example, for polymerizing butadiene monomer alone the reaction temperature can be varied from about 100° F. to about 270° F. and pressure can be varied from about 100 p.s.i.a. to about 1,000 p.s.i.a. The extruder-devolatilizer temperature, likewise can vary, for example, between the limits of about 150° F. to about 400° F.

In the above example, a solution of butyllithium is injected into the monomer stream at the rate of about 0.05 part by weight per 100 parts by weight of butadiene monomer. This concentration of butyllithium can be varied, for example, between about 0.01 to 0.2 part by weight per hundred parts by weight of butadiene.

In this instance, one part stearic acid per hundred parts polymer is added to the extruder devolatilizer to neutralize the lithium-containing catalyst. On polymerizing, 1,3-butadiene produces a rubber-like polymer.

Other polymerizable monomeric materials than butadiene, as feed, can be used in this process for producing rubbery polymers, such as isoprene, 2,3-dimethyl-1,3-butadiene, 2-methyl-1,3-pentadiene, and other dienes listed in a copending application, Serial No. 45,042, filed July 25, 1960, and now Patent No. 3,099,648. 1-olefins polymerizable with the just-mentioned dienes are such as ethylene, propylene, 1-butene, 1-hexene, isobutylene, styrene, methyl styrene, and others also listed in said copending application. Catalyst systems used in polymerizing the dienes, and dienese with 1-olefins include, as catalysts, organometals, organometal hydrides of metals of Groups I, II and III of the Periodic System, in combination with a metal halide, such as titanium trichloride and/or titanium tetraiodide, or the nonmetal iodine. Examples of suitable organometals are trimethylaluminum, triethylaluminum, and diethyl hydrogen aluminum. Suitable catalyst inactivating or shortstop agents include such materials as hydroquinone, pyrogallol, catechol, aniline, quinoline, fatty acids such as stearic acid, a preferred inactivating agent being rosin acid. Suitable antioxidants are N-isopropyl-N'-phenyl-p-phenylenediamine, methylene-2,2'-bis(4-methyl-6-tert-butylphenol), and other similar materials. Additional listings of suitable catalyst systems, catalyst inactivating agents and antioxidants are also given in said copending application.

Still other types of hydrocarbons can be polymerized according to this invention, for example, such mono-1-olefins as propylene, butylene, isobutylene, other 1-olefins such as styrene, methyl styrene, etc., or mixtures of any two or more thereof. Monomer mixtures of one or more of these 1-olefins with low concentrations of ethylene can also be employed as feed materials and sprayed as liquid droplets into the reaction vessel when maintained under suitable pressure conditions. The process is, in general, not applicable to polymerization of ethylene alone because of its relatively low critical temperature. Ethylene has a critical temperature of about 49° F. To be operable, a feed stock must be a liquid at polymerization temperature. Pressure is maintained sufficiently high to make certain that the sprayed feed monomeric material is liquid. Propylene has a critical temperature of about 197° F. Thus, to be polymerized according to this invention, the polymerization temperature for propylene must be below 197° F. and if ethylene is to be polymerized alone the polymerization temperature must be below the above-mentioned 49° F. However, mixtures of ethylene with other 1-olefins can be polymerized at temperatures above the critical temperature of ethylene as long as the feed material is sprayable as a liquid at a suitable polymerization temperature. Some catalysts employed in the mono-1-olefin polymerization are liquid or are solids which are soluble in a liquid hydrocarbon carrier. Other catalysts which are insoluble in hydrocarbons can also be used. A listing of suitable catalysts for the polymerization of the mono-1-olefins is given in a copending application, Serial No. 174,002, filed February 19, 1962. Suitable nonvolatile shortstops or catalyst inactivating agents are used in deactivating the just-mentioned catalysts by addition through conduit 55.

In a copending application, Serial No. 721,293, filed March 13, 1958, is a full and complete disclosure of the copolymerization of butadiene and styrene in the presence of normal butyllithium as catalyst in a solution. This copending application discloses a method for producing the normal butyllithium catalyst which is disclosed hereinabove as suitable for use according to this invention. Suitable shortstop and antioxidant additives for use herein are also described in this latter-mentioned copending application.

In a copending application, Serial No. 218,853, filed August 23, 1962, is disclosed lithium-containing catalysts or initiators suitable for polymerizing 1,3-butadiene according to this invention. These materials have the formula $RLi_x$, wherein R is a hydrocarbon radical selected from the group consisting of aliphatic, cycloaliphatic and aromatic radicals and $x$ is an integer from 1 to 4, inclusive. The R in the formula has a valence equal to the integer and preferably contains from 1 to 20, inclusive, carbon atoms, although higher molecular weight compounds can be utilized. In preparing the polybutadiene, it is often preferred to use an alkyllithium compound, such as n-butyllithium, as the catalyst. Examples of other suitable organolithium compounds include methyllithium, isopropyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,3,5-tetralithiocyclohexane, 1,2,3,5-tetralithio-4-hexylanthracene, and the like.

Other pigments, fillers or reinforcing agents than carbon black are also useful herein and are added by way of the extruder-devolatilizer, as mentioned relative to carbon black. Such other pigments, fillers or reinforcing agents are titanium dioxide, silica, coal tar resins and others known in the art. Extender oils, such as petroleum distillates; vegetable oils, such as linseed and soybean oils; esters, such as butyl cellosolve pelargonate; di-n-hexyladipate; and trioctyl phosphate; chlorinated hydrocarbons; ethers; ketones; turpenes; gum turpentine; resin; pine tar; coal tar products, such as liquids from distillates, including alkyl naphthalenes and polynuclear aromatics; semisolids from coal tar, including low molecular weight polymers of coumarone-indene, and related resins; liquid polymers of conjugated dienes such as liquid polybutadiene and liquid polyisoprene; and clay tower polymers. These extender oils and materials are used only when the polymer produced according to this invention is a rubber-like polymer.

However, such pigment agents as carbon black, titanium dioxide, and other coloring materials can be used when the polymer produced according to this invention is a resin as well as a rubber-like material.

Solid materials as catalysts or as catalyst supports would be quite difficult to separate from the produced solid polymer particles as will be realized by those skilled in such art. However, such catalyst supports can be used and allowed to remain in the polymer if they do not interfere with the end use of the product.

While certain embodiments of the invention have been described for illustrative purposes, the invention obviously is not limited thereto.

I claim:

1. A method for bulk polymerization of monomeric liquid material comprising cooling said monomeric liquid material to a temperature at which polymerization is relatively slow, admixing a suitable polymerization catalyst with said monomeric material at said temperature, spraying the admixture downwardly in the upper portion of an enclosed vertically elongated polymerization zone, simultaneously passing vapor of said monomeric material heated to at least polymerization temperature of said monomeric material and at a temperature higher than that of said admixture upwardly in said zone in direct contact with the gravitating admixture thereby heating said admixture to rapid polymerization temperature, thus promoting polymerization, forming polymer, and evaporating unpolymerized monomer from the polymer thereby leaving substantially polymer of relatively low monomer content, passing the latter polymer into a devolatilizer and thereby vaporizing remaining monomer and withdrawing polymer as the product of the operation.

2. A process comprising admixing a polymerization catalyst with a polymerizable monomeric liquid material at a temperature at which polymerization is relatively slow, forming the admixture into spray-size droplets and gravitating said droplets into a polymerization zone, maintaining said zone at a temperature suitable for promoting polymerization of said admixture, introducing into the lower portion of said zone additional polymerizable monomeric material in vapor form at a temperature at which polymerization proceeds rapidly thereby tending to heat the downflowing droplets by direct contact therewith, evaporating unpolymerized monomer from said droplets in the lower portion of said zone thereby further cooling said droplets and eliminating tendency toward runaway polymerization, and withdrawing droplets of polymer from the lower portion of said zone.

3. A process comprising admixing a catalyst suitable for promoting polymerization of a polymerizable monomeric material in liquid form with said material at a temperature at which polymerization is relatively slow, forming the admixture into spray size droplets and passing same downwardly in a polymerization zone, heating said droplets to their polymerization temperature by passing upwardly and countercurrently thereto in said zone additional monomeric material in vapor form in direct contact with said admixture at a higher temperature than that of said admixture thereby starting rapid polymerization of said material in said droplets, this latter polymerization being exothermic, and vaporizing at least a portion of the polymerizable material not polymerized from said droplets, this vaporizing being endothermic, thereby cooling the downwardly passing droplets and eliminating any tendency toward runaway polymerization, passing the polymerized material containing the remainder of the monomeric material of said droplets into a devolatilizing zone and therein volatilizing said remainder of said monomeric material from the polymeric material and withdrawing this latter material as product of the operation.

4. In the process of claim 12, withdrawing at least a portion of said additional monomeric material from the upper portion of said zone, condensing same and returning the condensate to the admixing step as a portion of the feed material.

5. On the process of claim 12, introducing a shortstop material into said volatilizing zone thereby terminating polymerization.

6. The process of claim 12 wherein said polymerizable monomeric material comprises 1,3-butadiene.

7. The process of claim 12 wherein said catalyst comprises n-butyllithium.

8. The process of claim 12 wherein said catalyst comprises titanium tetraiodide and diethylaluminum chloride.

9. In the process of claim 12, replacing a portion of said additional monomeric material with a gas chemically inert to the operation and comprising gaseous nitrogen.

10. The process of claim 12 wherein said polymerizable monomeric material contains propylene.

11. The process of claim 12 wherein said polymerizable monomeric material includes ethylene.

12. A process for polymerizing a polymerizable monomeric liquid material which comprises the steps of:
(1) gravitating droplets of a mixture of said monomeric material and polymerization catalyst effective for polymerizing said material into an enclosed upright elongated polymerization zone at a temperature at which polymerization is relatively slow;
(2) passing a vapor stream comprising said monomeric material at an inlet temperature substantially above the inlet temperature of said droplets, upwardly thru said zone in direct contact with said droplets so as to heat same and initiate rapid polymerization within said droplets;
(3) after the temperature in said zone is raised to an effective rapid polymerization temperature, controlling the inlet temperature of the vapor stream of step (2) so as to maintain a selected polymerization temperature in said zone;
(4) collecting polymer from the bottom section of said zone; and
(5) withdrawing vapor from the upper section of said zone.

References Cited by the Examiner
UNITED STATES PATENTS

| | | | |
|---|---|---|---|
| 2,823,198 | 2/58 | Ridgway | 260—95 |
| 2,904,409 | 9/59 | Bolstad | 260—95 |
| 3,002,961 | 10/61 | Kirschner et al. | 260—94.9 |
| 3,023,203 | 2/62 | Dye | 260—94.9 |
| 3,037,011 | 5/62 | Leibson et al. | 260—94.9 |

JOSEPH L. SCHOFER, *Primary Examiner.*